3,042,633
RUBBER POWDER
Woodrow W. White, Oxford, Conn., assignor to United States Rubber Company, New York, N.Y., a corporation of New Jersey
No Drawing. Filed Apr. 19, 1957, Ser. No. 653,745
12 Claims. (Cl. 260—3)

This invention relates to improvements in rubber powder for incorporation in the bituminous binder used in building roads, and for other purposes.

In conventional road building practice, hot bituminous binder (asphalt or road tar) is mixed with the aggregate at a pug mill, generally in amount from 3 to 15% on the weight of the aggregate, and the mix is then transported to the paving site, or the dry aggregate is first laid on the road and the hot bituminous binder is then sprayed on the aggregate. In these operations the binder is at a temperature of 250° F. to 400° F. (generally 250° F. to 350° F.).

Rubber powders prepared directly from natural and synthetic rubber latices have been incorporated in the hot bituminous binder used with the mineral aggregate in forming paving compositions, generally in amounts to give 1 to 15 parts of rubber per 100 parts of bituminous binder. However, such rubber powders do not flow easily and have a tendency to sinter in storage and thus make difficult their handling and measuring and their gradual addition to the hot melt of bituminous material. One method of attempting to overcome this difficulty has been to vulcanize the latex before producing the rubber powder. Another method has been to coprecipitate the rubber in the latex with an equal amount or more of ground inert mineral filler. These methods introduce other disadvantages. The vulcanization reduces the compatibility of the rubber with the bituminous binder. The large amount of filler increases the extraneous material which is shipped about and has a tendency to settle out when added to bulk quantities of the bituminous binder.

By the present invention, there is provided an improved rubber powder which is free-flowing and non-sintering under storage conditions and which is readily and uniformly dissolved or dispersed in hot bituminous material.

According to the present invention, the individual particles of rubber powder prepared directly from latex are coated with an aldehyde resin which imparts the free-flowing properties to the crumbs, and permits ready dissolution of the rubber in the bituminous material. Such resin coated powder may be mixed with the hot bituminous binder for the aggregate in road building generally in amount from 1 to 15 parts of rubber per 100 parts of bituminous binder. Mixtures of bituminous material and the resin coated powder in amount up to 25 parts of rubber per 100 parts of bituminous material may be used as expansion joint fillers in road construction, and as laminating adhesives in making paper to paper and paper to metal foil laminates. The rubber powders with the resin coating on the individual rubber particles may be used directly in molding and extrusion processes to give finished rubber articles.

In carrying out the present invention, the rubber latex which may be unvulcanized or vulcanized or which may contain vulcanizing ingredients, softeners, extenders or fillers, emulsified or dispersed therein, is flocculated in the conventional manner to form ready filterable flocs. For example, the latex may be creamed by addition of a solution of a monovalent salt, such as sodium chloride, and then flocculated with dilute acid, such as sulfuric, hydrochloric or acetic acid, or by dilute solutions of multivalent salts of strong acids, such as calcium chloride or aluminum sulfate. The addition of up to 20 parts of sodium lignate per 100 parts of rubber of the latex before flocculation gives flocs of reduced size. After the latex has been coagulated to a fine flocculate, an aldehyde resin is incorporated in the aqueous medium of the slurry of the rubber flocs and the resin is precipitated therein to form a water-insoluble coating on the flocs. The flocs may then be dewatered as by filtering, and dried as in conventional rubber practice. The aldehyde resin may be phenol-aldehyde, resorcinol-aldehyde, urea-aldehyde, melamine-aldehyde or aniline-aldehyde resin in which the aldehyde is formaldehyde or acetaldehyde. An aqueous solution of the reatant other than the aldehyde may be added to the aqueous slurry of the rubber flocculate followed by an aqueous solution of the aldehyde or an aqueous solution of a mixture of the two may be added to the aqueous slurry. The molar ratio of reactant other than aldehyde to aldehyde is generally from about 1:0.75 to 1:2.0. The mixture of the resin reactants in aqueous acid medium of the slurry of the rubber fluocculate is agitated for a short time, e.g. from ½ to 3 hours at temperature from 50° C. to 100° C. for formation of the water-soluble resin after which the pH is raised to 8 or above by the addition of dilute alkali. As the pH is raised, the resin which has been formed in the acid phase is precipitated and deposited on the surface of the rubber flocs giving a product which is non-tacky because the particles are coated with a brittle non-tacky resin. The resulting particles are dewatered as by filtering, and dried, giving a fine free-flowing powder. The amount of resin may be from 2 to 30% of the final coated particles with the preferred level being 10 to 16%. The dried resin coated rubber particles may be in the range from 10 to 200 mesh, and generally will be in the range from 30 to 100 mesh. The amount of the thus prepared resin coated rubber powder that is mixed with the hot bituminous binder is that which gives from 1 to 15 parts of rubber per 100 parts of the asphalt or road tar binder, whether added as such in the pug mill with the hot aggregate and the binder, or mixed with the hot binder before introduction into the pug mill, or mixed with the hot binder before spraying on the rolled hot aggregate. As above described, the temperature of the binder in these operations is from 250° F. to 400° F. (generally 250° to 350° F.).

The latex may be a natural or synthetic rubber latex. The synthetic rubber latex may be a so-called butadiene polymer synthetic rubber latex, i.e. an aqueous emulsion polymerizate of one or more butadienes-1,3, for example, butadiene-1,3, 2-methylbutadiene-1,3 (isoprene), 2-chlorobutadiene-1,3 (chloroprene), 2,3-dimethylbutadiene-1,3, piperylene, or a mixture of one or more such butadienes-1,3 with one or more other polymerizable compounds which are capable of forming rubbery copolymers with butadienes-1,3, for example, up to 70% by weight of such mixture of one or more compounds which contain a $CH_2=C<$ group where at least one of the disconnected valences is attached to an electronegative group, that is, a group which substantially increases the electrical dissymmetry or polar character of the molecule. Examples of compounds which contain a $CH_2=C<$ group and are copolymerizable with butadiene-1,3 hydrocarbons are aryl olefines, such as styrene, vinyl toluene, alpha methyl styrene, chlorostyrene, dichlorostyrene, vinyl naphthalene; the alpha methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride; vinyl pyridines; alkyl vinyl pyridines. Common commercial synthetic rubber latices are latices of GR-S (copolymer of a major proportion of butadiene and a minor proportion of styrene), Paracril (copolymer of a major proportion of butadiene and a minor proportion of acrylonitrile); and neoprene (polymerized chloro-2-butadiene-1,3). Such latices may be compounded with softeners, extenders and fillers by adding emulsions or dispersions of the same to the latex before flocculation. For example, asphalt and tar softeners and extender oils such as heavy petroleum fractions may be added to the latex as emulsions generally in amount up to one-half the weight of the rubber. Similarly inert fillers, such as silica may be formed in situ in the latex, or inert fillers such as silica and carbon black may be added to the latex as dispersions generally in amount up to one-half of the weight of the rubber.

The following illustrates the invention. All parts and percentages referred to herein are by weight.

144 pounds (40 pounds dry weight) of a latex of a copolymer of 75 parts of butadiene and 25 parts of styrene were stabilized to oxidation by the addition of 1.89 pounds (0.6 pounds dry weight) of an aqueous emulsion of condensed diphenylamine acetone reaction product. A solution of sodium lignate which had been prepared by dissolving 0.82 pounds of sodium hydroxide in 10 pounds of water and dissolving 2.0 pounds of lignin (Indulin A) in the solution was then added. This mixture was creamed with 320 pounds (24 pounds dry weight) of a sodium chloride solution which was adjusted to a pH of 10 with sodium hydroxide. Flocculation was then accomplished under vigorous agitation, by the addition of sufficient sulfuric acid-tetraethylene pentamine solution (2 pounds sulfuric acid and 0.4 pounds of tetraethylene pentamine to obtain smooth flocculation per 38 pounds of water) to reduce the pH to 2. The flocculate was in very fine particles. A solution containing 3.3 pounds of aniline dissolved in 1.9 pounds of sulfuric acid and 74.8 pounds of water was then added followed by the addition of 10 pounds (4 pounds dry weight) of 40% formaldehyde. The mixture was then held under agitation at 140–150° F. for one hour, after which the pH was raised to 8 using a solution of sodium hydroxide. The resin deposited on the rubber flocs. The fine flocculate was then filtered onto cheese cloth and dried overnight at 170° F. After drying the product was in the form of porous chunks which disintegrated into very fine free-flowing powder of about 40 mesh under mild grinding conditions.

Three parts of the thus prepared resin coated rubber powder were added to 97 parts of asphalt heated to about 350° F. in a closed container equipped with an agitator. The asphalt had a penetration value at 77° F. of 110–120 (A.S.T.M. D5–52). The rubber was completely dispersed in the asphalt giving a smooth mix in three hours. Such blend is useful as a binder for the aggregate in road construction.

Twenty parts of the above resin coated rubber powder were added to 80 parts of asphalt at 325° F. in an internal mixer of the Werner and Pfleiderer type. The asphalt had a penetration value at 77° F. of about 200 (A.S.T.M. D5–52). The rubber was completely dispersed in the asphalt giving a smooth mix in four hours. Such blend is useful for filling expansion joints in paving construction by pouring in melted condition between adjacent paving sections.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A free flowing dried resin coated rubber powder the particles of which are 10 to 200 mesh size and are coated with resin selected from the group consisting of phenol-aldehyde, resorcinol-aldehyde, urea-aldehyde, melamine-aldehyde and aniline-aldehyde resins in which the aldehyde is selected from the group consisting of formaldehyde and acetaldehyde, said resin being precipitated from a soluble state in an aqueous acid medium in admixture with previously flocculated rubber latex particles onto said flocculated rubber latex particles, said rubber being selected from the group consisting of natural rubber and synthetic rubber emulsion polymerizates of material selected from the group consisting of butadienes-1,3 and mixtures of butadienes-1,3 with compounds which contain a $CH_2=C<$ group and are copolymerizable with butadienes-1,3.

2. A free flowing dried resin coated rubber powder the particles of which are 10 to 200 mesh size and are coated with aniline-formaldehyde resin, said resin being precipitated from a soluble state in an aqueous acid medium in admixture with previously flocculated rubber latex particles onto said flocculated rubber latex particles, said rubber being selected from the group consisting of natural rubber and synthetic rubber emulsion polymerizates of material selected from the group consisting of butadienes-1,3 and mixtures of butadienes-1,3 with compounds which contain a $CH_2=C<$ group and are copolymerizable with butadienes-1,3.

3. A free flowing dried resin coated rubber powder the particles of which are 10 to 200 mesh size and are coated with resin selected from the group consisting of phenol-aldehyde, resorcinol-aldehyde, urea-aldehyde, melamine aldehyde and aniline-aldehyde resins in which the aldehyde is selected from the group consisting of formaldehyde and acetaldehyde, said resin being in amount from 2 to 30% by weight of the coated particles and being precipitated from a soluble state in an aqueous acid medium in admixture with previously flocculated rubber latex particles onto said flocculated rubber latex particles, said rubber being selected from the group consisting of natural rubber and synthetic rubber emulsion polymerizates of material selected from the group consisting of butadienes-1,3 and mixtures of butadienes-1,3 with compounds which contain a $CH_2=C<$ group and are copolymerizable with butadienes-1,3.

4. A free flowing dried resin coated rubber powder the particles of which are 10 to 200 mesh size and are coated with aniline-formaldehyde resin, said resin being in amount from 2 to 30% by weight of the coated particles and being precipitated from a soluble state in an aqueous acid medium in admixture with previously flocculated rubber latex particles onto said flocculated rubber latex particles, said rubber being selected from the group consisting of natural rubber and synthetic rubber emulsion polymerizates of material selected from the group consisting of butadienes-1,3 and mixtures of butadienes-1,3 with compounds which contain a $CH_2=C<$ group and are copolymerizable with butadienes-1,3.

5. The method of making free flowing resin coated rubber powder of particles of 10 to 200 mesh size from latex which comprises first flocculating the latex and then depositing resin selected from the group consisting of phenol-aldehyde, resorcinol-aldehyde, urea-aldehyde, melamine aldehyde and aniline-aldehyde resins in which the aldehyde is selected from the group consisting of formaldehyde and acetaldehyde on the wet flocs to coat the same, dewatering the coated rubber flocs of the flocculated latex, and drying, said rubber being selected from the group consisting of natural rubber and synthetic rubber emulsion polymerizates of material selected from the group consisting of butadienes-1,3 and mixtures of butadienes-1,3 with compounds which contain a $$CH_2=C<$$

group and are copolymerizable with butadienes-1,3.

6. The method of making free flowing resin coated rubber powder of particles of 10 to 200 mesh size from latex which comprises first flocculating the latex and then depositing aniline-formaldehyde resin on the wet flocs to coat the same, dewatering the coated rubber flocs of the flocculated latex, and drying, said rubber being selected from the group consisting of natural rubber and synthetic rubber emulsion polymerizates of material selected from the group consisting of butadienes-1,3 and mixtures of butadienes-1,3 with compounds which contain a $CH_2=C<$ group and are copolymerizable with butadienes-1,3.

7. The method of making free flowing resin coated rubber powder of particles of 10 to 200 mesh size from latex which comprises first flocculating the latex and then depositing resin selected from the group consisting of phenol-aldehyde, resorcinal-aldehyde, urea-aldehyde, melamine aldehyde and aniline-aldehyde resins in which the aldehyde is selected from the group consisting of formaldehyde and acetaldehyde on the wet rubber flocs of the flocculated latex to coat the same, dewatering the coated flocs, and drying, said resin being precipitated from a soluble state in an aqueous acid medium in admixture with the flocculated rubber latex particles onto said flocculated rubber latex particles, said rubber being selected from the group consisting of natural rubber and synthetic rubber emulsion polymerizates of material selected from the group consisting of butadienes-1,3 and mixtures of butadienes-1,3 with compounds which contain a $CH_2=C<$ group and are copolymerizable with butadienes-1,3.

8. The method of making free flowing resin coated rubber powder of particles of 10 to 200 mesh size from latex which comprises first flocculating the latex and then depositing aniline-formaldehyde resin on the wet rubber flocs of the flocculated latex to coat the same, dewatering the coated flocs, and drying, said resin being precipitated from a soluble state in an aqueous acid medium in admixture with the flocculated rubber latex particles onto said flocculated rubber latex particles, said rubber being selected from the group consisting of natural rubber and synthetic rubber emulsion polymerizates of material selected from the group consisting of butadienes-1,3 and mixtures of butadienes-1,3 with compounds which contain a $CH_2=C<$ group and are copolymerizable with butadienes-1,3.

9. A composition comprising a blend of bituminous material and a free flowing resin coated rubber powder as defined in claim 3, the rubber content of the blend being from 1 to 25 parts per 100 parts of the bituminous material.

10. A composition comprising a blend of bituminous material and a free flowing resin coated rubber powder as defined in claim 4, the rubber content of the blend being from 1 to 25 parts per 100 parts of the bituminous material.

11. The method of uniformly dispersing rubber in bituminous material which comprises mixing with hot bituminous material a free flowing resin coated rubber powder prepared according to the method of claim 5.

12. The method of uniformly dispersing rubber in bituminous material which comprises mixing with hot bituminous material a free flowing resin coated rubber powder prepared according to the method of claim 6.

References Cited in the file of this patent

UNITED STATES PATENTS

| | | |
|---|---|---|
| 2,277,941 | Almy | Mar. 31, 1942 |
| 2,314,181 | Winterkorn | Mar. 16, 1943 |
| 2,610,158 | Hall | Sept. 9, 1952 |
| 2,700,655 | Endres et al. | Jan. 25, 1955 |
| 2,845,397 | Mills | July 29, 1958 |
| 2,857,351 | Carrol | Oct. 21, 1958 |

FOREIGN PATENTS

| | | |
|---|---|---|
| 381,587 | Great Britain | Oct. 7, 1932 |

OTHER REFERENCES

Clinebell et al.: "A Survey on the Use of Rubber in Bituminous Pavements," Rubber Age, volume 70, pub. October 1951, page 70.